United States Patent
Katori et al.

[11] 3,927,082
[45] Dec. 16, 1975

[54] 2-ALKOXYBENZOYLAMINO ACIDS

[75] Inventors: Tatsuhiko Katori, Tone; Giichi Sato, Chiba; Takashi Kihara, Narita; Norio Yumoto, Tomisato; Shigeru Makino, Narashino; Juntaro Harada, Yachiyo, all of Japan

[73] Assignee: SS Pharmaceutical Co., Ltd., Tokyo, Japan

[22] Filed: Feb. 5, 1974

[21] Appl. No.: 439,693

[30] Foreign Application Priority Data
Feb. 14, 1973 Japan.................................. 48-17483
Apr. 17, 1973 Japan.................................. 48-43451

[52] U.S. Cl.................................. 260/519; 424/319
[51] Int. Cl.²................................. C07C 103/22
[58] Field of Search................................. 260/519

[56] References Cited
UNITED STATES PATENTS
| | | | |
|---|---|---|---|
| 2,440,658 | 4/1948 | Urist et al. | 260/519 |
| 3,489,793 | 1/1970 | Bertelli et al. | 260/519 |
| 3,651,133 | 3/1972 | Ghelardoni et al. | 260/519 |

FOREIGN PATENTS OR APPLICATIONS
| | | | |
|---|---|---|---|
| 670,751 | 1/1966 | Belgium | 260/519 |
| 36-267 | 5/1958 | Japan | 260/519 |

*Primary Examiner*—Anton H. Sutto
*Assistant Examiner*—L. A. Thaxton
*Attorney, Agent, or Firm*—Oblon, Fisher, Spivak, McClelland & Maier

[57] ABSTRACT

2-Alkoxybenzoylamino acids having the formula

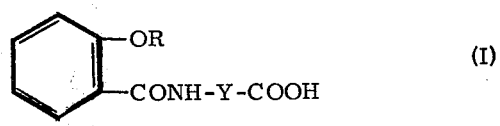

wherein R represents an alkyl group having from 5 to 12 carbon atoms and Y represents a methylene or propylene group, possess superior antipyretic and analgic effects. Compounds of this formula are produced by reacting a 2-alkoxybenzoyl halide with an amino acid.

6 Claims, No Drawings

3,927,082

2-ALKOXYBENZOYLAMINO ACIDS

BACKGROUND OF THE INVENTION

1. Field of the Invention

This invention relates to novel 2-alkoxybenzoylamino acids possessing excellent antipyretic and analgic effects and a process for their preparation.

2. Description of the Prior Art 2-alkoxybenzoylamino acids having the formula:

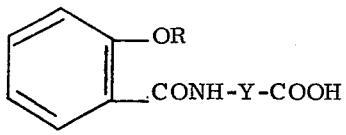

wherein R represents an ethyl or an allyl group and Y represents a methylene or an ethylene group are known and have been reported to possess antipyretic, analgic and antispastic effects (Japanese Patent Publication No. 267/1961).

However, the antipyretic effect of the known 2-alkoxybenzoylamino acids is relatively low and does not last for a sufficient length of time. A need exists, therefore, for 2-alkoxybenzoylamino acids which have a high antipyretic effect which is sustained for prolong periods.

SUMMARY OF THE INVENTION

Accordingly, one object of this invention is to provide 2-alkoxybenzoylamino acids possessing excellent antipyretic and analgic effects.

Another object of this invention is to provide 2-alkoxybenzoylamino acids which exhibit an excellent antispastic effect.

Yet another object of this invention is to provide a process for obtaining 2-alkoxybenzoylamino acids having excellent antipyretic effects.

Briefly, these and other objects of the invention as hereinafter will become apparent are achieved by 2-alkoxybenzoylamino acids represented by the formula:

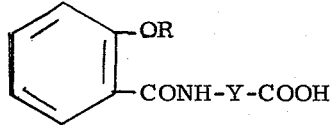

wherein R represents an alkyl group having from 5 to 12 carbon atoms and Y represents a methylene or propylene group.

DESCRIPTION OF THE PREFERRED EMBODIMENTS

It has been found that the compounds having the general formula (I), wherein R represents an alkyl group of from 5 to 12 carbon atoms and Y represents a methylene or a propylene group, unexpectedly possess several times as high a antipyretic effect as those of the prior art. Also, the anitpyretic effect lasts for a longer time in comparison with the known compounds described above and in addition, they exert an excellent antispastic effect. Especially preferred compounds of very high activity are those of formula (II) and (III).

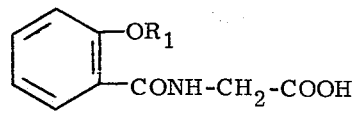

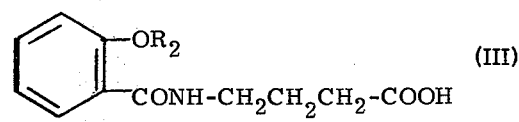

wherein $R_1$ represents an alkyl group having 6 to 12 carbon atoms and $R_2$ represents an alkyl group having 5 to 10 carbon atoms.

The 2-alkoxybenzoylamino acid represented by the formula (I) can be produced by reacting 2-alkoxybenzoyl halide (IV) with an amino acid (V) as follows:

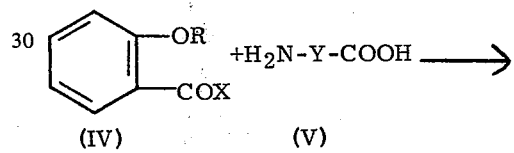

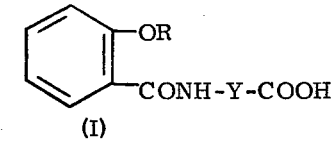

wherein X represents a halogen atom and R and Y represent the same as defined above.

In carrying out the process of the present invention, (V) is dissolved in a suitable solvent such as water or the like and to the resultant solution is added dropwise small portions of (IV).

The reaction is preferably conducted in the presence of an acid-receptor such as caustic alkali, alkali carbonate, organic base or the like.

The antipyretic and analgic effects of the 2-alkoxybenzoyl amino acid represented by formula (I) of this invention are shown below, in comparison with the known compounds described above.

1. Hypothermal effect on mice

Samples suspended in physiological saline solutions were given i.p. in a dose of 100 mg./Kg.-body weight to groups of 5 male mice of dd strain weighing 25–40 g. and the degree of hypothermy was measured rectumly. The results are shown in Table 1.

TABLE 1

| Group Y | Group R | Degree of hypothermy (mean value °C) | Duration (mean value, minutes) |
|---|---|---|---|
| —CH₂— | Ethyl | 2.0 | 17 |
| ″ | Allyl | 2.5 | 40 |
| —CH₂CH₂C- | Ethyl | 2.0 | 6 |

TABLE 1-continued

| Group Y | Group R | Degree of hypothermy (mean value °C) | Duration (mean value, minutes) |
|---|---|---|---|
| $H_2$— | | | |
| " | Allyl | 2.0 | 8 |
| —$CH_2$— | n-Hexyl | 2.8 | 85 |
| " | n-Heptyl | 4.1 | 85 |
| " | n-Octyl | 15.1 | 230 or more |
| " | n-Nonyl | 6.9 | 190 or more |
| " | n-Decyl | 3.7 | 100 |
| " | n-Dodecyl | 2.8 | 98 |
| —$CH_2CH_2CH_2$— | n-Amyl | 15.2 | 240 or more |
| " | n-Hexyl | 9.7 | 240 or more |
| " | n-Heptyl | 4.5 | 80 |
| " | n-Octyl | 4.0 | 80 |
| " | n-Nonyl | 4.8 | 100 |
| " | n-Decyl | 4.0 | 60 |

2. Antipyretic effect on rabbits

Groups of three rabbits each were immobilized in a cylindrical rabbit settler for 2 hours prior to the beginning of the experiment. The experiment was commenced after a sufficient decrease in the rectal temperature occured. Pyrexia was caused by injecting Lipopolysaccharide B.E. Coli O:128:B12 (DIFCO LAB) as a pyrogen in a dose of 2γ/Kg. into the ear vein to obtain a pyrexial curve. The same animals were examinend after more than one week. Samples were administered orally in a dose of 100 mg./Kg. body weight 15 minutes before the injection of the pyrogen. The results are shown in Table 2.

TABLE 2

| Compounds | | Degree of hypothermy (°C) | | | Mean (°C) |
|---|---|---|---|---|---|
| Group Y | Group R | | | | |
| —$CH_2$— | Ethyl | −0.4 | 0.1 | 0.0 | −0.1 |
| " | Allyl | 0.3 | 0.2 | 0.2 | 0.23 |
| —$CH_2$— | n-Hexyl | 0.7 | 0.45 | 0.5 | 0.55 |
| " | n-Octyl | 1.3 | 1.16 | 1.5 | 1.32 |
| " | n-Decyl | 0.73 | 0.95 | 0.96 | 0.88 |
| " | n-Dodecyl | 0.55 | 0.72 | 0.65 | 0.64 |

3. Analgic (Analgesic) effect

Analgic effect was examined by the Writhing Syndrome method.

Experimental method

One group of 6 dd strain male mice weighing about 15 g. was used. 0.1 ml./10g. of 0.6% acetic acid solution was given i.p. and the number of writhing during a period of 10 minutes after injection and during a period from 10 to 20 minutes after injection were respectively counted. Medicaments were administered orally 15 minutes before injecting the acetic acid solution.

The results are shown in Table 3.

TABLE 3

Number of writhing after drug administration

| Drugs | Route | Number of writhing |
|---|---|---|
| Control (0.6% Acetic acid) | i.p. | 16.3±10.1 (for 0–10 min.) 20.2±16.3 (for 10–20 min.) 18.3±13.7 (for 0–20 min.) |
| Control | p.o. | 21.0±11.1 |
| Y=—$CH_2$— R=Ethyl (50mg./Kg.) | | 11.2± 6.9 16.1±10.5 |
| Control | " | 13.3±10.3 |
| Aspirin (50mg./Kg.) | " | 16.0± 9.3 14.7± 9.9 |
| Y=—$CH_2$— R=n-Hexyl | p.o. | 11.0± 9.1 8.7± 6.1 |

| Drugs | Route | Number of writhing |
|---|---|---|
| (50 mg./Kg.) | | 9.8± 7.7 |
| Y=—$CH_2$— R=n-Octyl (50mg./Kg.) | " | 13.0± 9.3 8.8± 7.3 10.9± 8.6 |
| Y=—$CH_2$— R=n-Dodecyl (50mg./Kg.) | p.o. | 2.2± 2.4 2.2± 2.2 1.1± 2.0 |
| Y=—$CH_2CH_2CH_2$— R=n-Heptyl (50mg./Kg.) | " | 9.5± 6.3 13.7± 9.9 11.6± 8.6 |
| Y=—$CH_2CH_2CH_2$— R=n-Hexyl (50mg./Kg.) | " | 13.0±13.1 11.3±11.6 12.2±12.4 |
| Y=—$CH_2CH_2CH_2$— R=n-Octyl (50 mg./Kg.) | " | 9.2± 7.2 12.7± 7.3 12.7± 7.4 |

(Note)
i.p. : Intraperitoneal administration
p.o. : Oral administration

4. Acute toxicity of all compounds of the present invention $LD_{50}$ (per os, mice): more than 1 g./Kg.

These compounds may be used as medicaments in human medicine in the form of pharmaceutical compositions. These compositions contain the specified compounds in admixture with a pharmaceutical acceptable organic or inorganic carrier material suitable for internal or parenteral administration. The carrier material is a substance, which does not react with the desired compounds, for example, water, gelatine, lactose, petroleum jelly, starch, magnesium stearate, talc, vegetable oils, benzyl alcohol, gums, polyalkylene glycols, cholesterol or other known medicament carriers. The pharmaceutical compositions can be made up, for example, as tablets or dragees, in liquid form as solutions, suspension, emulsions, ointments, or suppositories. If desired, they are sterilized and/or allowed to contain auxiliary substances such as preserving, stabilizing, wetting or emulsifying agents. Usually, the pharmaceutical compositions are administered orally in a dose of from 50 – 300 mg. per body.

Having generally described this invention, a more complete understanding can be obtained by reference to certain specific examples, which are included for purposes of illustration only and are not intended to be limiting unless otherwise specified.

EXAMPLE 1

2-n-heptyloxybenzoylglycine:

4 g. of glycine were dissolved in 50 ml. of water and to the resultant solution 12.3 g. of 2-n-heptyloxybenzoyl chloride were added dropwise with stirring under ice cooling. During the addition the reaction mixture was always kept alkaline by adding a 20% sodium hydroxide solution. After the completion of the reaction, the solution was acidified with hydrochloric acid to deposit a white solid. The white solid was collected by filtration and washed with water. Recrystallization from ethyl acetate-n-hexane afforded 7.1 g. (47.3% of yield) of colorless needles having a melting point of 120°–122°C.

Elemental Analysis: as $C_{16}H_{23}NO_4$ (293.37).

| | C | H | N |
|---|---|---|---|
| Calculated (%): | 64.41 | 9.45 | 4.69 |
| Found (%): | 64.28 | 9.35 | 4.73 |

EXAMPLES 2 – 6

Using the starting materials described below under the same reaction conditions as of Example 1, there were obtained the following result:

7.0 g. of crude crystals. Recrystallization from ethyl acetate afforded 4.7 g. (51.6 % of yield) of pure crystals having a melting point of 97.5°–98.3°C.

Elemental Analysis: as $C_{19}H_{29}NO_4$ (335.45)

| | Starting materials (g) | Compounds | Yield g (%) | Melting point (°C) | Desired products Physical form | Elemental analysis Found (Calculated) (%) C | H | N |
|---|---|---|---|---|---|---|---|---|
| 2 | 2-n-hexyloxy-benzoyl chloride (10.2) | 2-n-hexyloxy-benzoylglycine $C_{15}H_{21}NO_4$ (279.34) | 4.4 (37.4) | 132–133 | colorless needles | 64.38 (64.50) | 7.20 (7.58) | 5.42 (5.01) |
| 3 | 2-n-octyloxy-benzoyl chloride (21.5) | 2-n-octyloxy-benzoylglycine $C_{17}H_{25}NO_4$ (307.39) | 6.2 (25.3) | 129–130 | colorless crystals | 66.07 (66.43) | 7.99 (8.19) | 4.82 (4.56) |
| 4 | 2-n-nonyloxy-benzoyl chloride (13.2) | 2-n-nonyloxy-benzoylglycine $C_{18}H_{27}NO_4$ (321.42) | 6.9 (42.7) | 118–120 | colorless crystals | 66.98 (67.26) | 8.19 (8.47) | 4.50 (4.36) |
| 5 | 2-n-decyloxy-benzoyl chloride (13) | 2-n-decyloxy-benzoylglycine $C_{19}H_{29}NO_4$ (335.45) | 6.5 (44.2) | 98–100 | colorless crystals | 68.93 (68.03) | 8.28 (8.71) | 4.34 (4.18) |
| 6 | 2-n-dodecyl-oxybenzoyl chloride (8.27) | 2-n-dodecyloxyben-zoylglycine $C_{21}H_{33}NO_4$ (363.50) | 4.1 (44.3) | 99–101.5 | colorless crystals | 69.21 (69.39) | 9.17 (9.15) | 4.00 (3.85) |

EXAMPLE 7

2-n-octyloxybenzoyl-γ-amino-n-butyric acid:

3.0 g. of γ-amino-n-butyric acid were dissolved in 20 ml. of water and to the resultant solution 7.3 g. of 2-n-octyloxybenzoyl chloride were added dropwise with stirring under ice cooling. During the addition the reaction solution was kept alkaline by adding a 20% potassium hydroxide solution. As the reaction proceeded the oily 2-n-octyloxybenzoyl chloride disappeared and the solution became clear. After stirring at room temperature for a short time, the solution was acidified with hydrochloric acid to deposit the desired product in the form of an oil. After cooling, the oil was allowed to stand to solidify. The solidified product was collected by filtration, washed with water, dried and to obtained

| | C | H | N |
|---|---|---|---|
| Calculated (%): | 68.03 | 8.71 | 4.18 |
| Found (%): | 67.99 | 8.65 | 4.20 |

EXAMPLES 8–12

Using the starting materials described below under the same reaction conditions as of Example 7, there were obtained the following result:

| | Starting materials (g) | Compounds | Yield g (%) | Melting point (°C) | Desired products Physical form | Elemental analysis Found (Calculated) (%) C | | N |
|---|---|---|---|---|---|---|---|---|
| 8 | 2-n-amyloxy-benzoyl chloride (4.5) | 2-n-amyloxy-benzoyl-γamino n-butyric acid $C_{16}H_{23}NO_4$ (293.37) | 2.9 (49.8) | 71.0–71.5 | colorless needles | 65.40 (65.51) | 7.79 (7.90) | 4.85 (4.77) |
| 9 | 2-n-hexyloxy-benzoyl chloride (23.0) | 2-n-hexyloxy-benzoyl-γ-amino-n-butyric acid $C_{17}H_{25}NO_4$ (307.39) | 9.5 (32.3) | 67.5–68.8 | colorless crystals | 66.42 (66.43) | 8.18 (8.20) | 4.59 (4.56) |
| 10 | 2-n-heptyloxy-benzoyl chloride (5.0) | 2-n-heptyloxy-benzoyl-γamino-n-butyric acid $C_{18}H_{27}NO_4$ (321.42) | 3.5 (55.5) | 68.0–69.0 | colorless crystals | 67.30 (67.26) | 8.39 (8.47) | 4.41 (4.36) |
| 11 | 2-n-nonyloxy-benzoyl chloride (5.0) | 2-n-nonyloxy-benzoyl-γ-amino-n-butyric acid $C_{20}H_{31}NO_4$ (349.47) | 2.7 (43.7) | 79.2–80.0 | colorless crystals | 68.55 (68.74) | 8.91 (8.94) | 4.08 (4.01) |
| 12 | 2-n-decyloxy-benzoyl chloride (6.8) | 2-n-decyloxy-benzoyl-γ-amino-n-butyric acid $C_{21}H_{33}NO_4$ (363.50) | 4.7 (56.4) | 81.5–82.7 | colorless crystals | 69.24 (69.39) | 9.13 (9.15) | 3.91 (3.85) |

EXAMPLE 13 (Tablet)

Prescription: A tablet (400.8 mg.) containing the following ingredients:

| | |
|---|---|
| 2-n-octyloxybenzoylglycine | 100 mg. |
| lactose | 159 mg. |
| crystalline cellulose | 150 mg. |
| talc | 0.4 mg. |
| magnesium stearate | 0.4 mg. |
| TOTAL | 400.8 mg. | was made by a conventional method to produce a white tablet having the following properties:

degree of hardness: 10–14 Kg.
degradation time: 8 –12 minutes

EXAMPLE 14 (Injection)

Prescription: An ampoule (2 ml.) containing the following ingredients:

| | |
|---|---|
| 2-n-octyloxybenzoylglycine | 100 mg. |
| anhydrous sodium carbonate | 18 mg. |
| distilled water for injection | suitable amounts |
| TOTAL | 2.0 ml. | was prepared. The mixture having the above composition was dissolved to form a clear solution. The solution was then sterilized at 120°C. for 15 minutes. The pH of this product is about 7.

EXAMPLE 15 (Suppository)

Prescription: A suppository (1,200 mg.) containing the following ingredients:

| | |
|---|---|
| 2-n-octyloxybenzoylglycine | 100 mg. |
| Witepsol W 35 | 935 mg. |
| Witepsol E 85 | 165 mg. |
| TOTAL | 1,200 mg. | was prepared by homogenously dispersing 2-n-octyloxybenzoyloxyglycine in a finely divided form in a base by heating at about 60°C. The dispersion was then cooled to 36°C and a container was filled with the dispersion with stirring and cooled to solidify the composition to form the suppository.

Having now fully described the invention, it will be apparent to one of ordinary skill in the art that many changes and modifications can be made thereto without departing from the spirit or scope of the invention as set forth herein.

What is claimed as new and intended to be covered by letters patent is:

1. Alkoxybenzoylamino acid represented by the general formula:

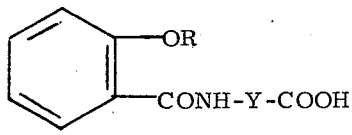

wherein R represents an alkyl group having 5 to 12 carbon atoms, and Y represents a methylene or propylene group.

2. The 2-alkoxybenzoylglycine of claim 1, wherein the R represents an alkyl group having 6 to 12 carbon atoms and Y is methylene.

3. The 2-alkoxybenzoylamino acid of claim 1, wherein R represents an alkyl group having 5 to 10 carbon atoms and Y is propylene.

4. The 2-alkoxybenzoylamino acid of claim 1, which is 2-n-octyloxybenzoylglycine.

5. The 2-alkoxybenzoylamino acid of claim 1, which is 2-n-dodecyloxybenzoylglycine.

6. The 2-alkoxybenzoylamino acid of claim 1, which is 2-n-amyloxybenzoyl-γ-amino-n-butyric acid.

* * * * *